United States Patent
Takagi

[11] Patent Number: 5,804,119
[45] Date of Patent: Sep. 8, 1998

[54] PROCESS FOR PRODUCING BIAXIALLY ORIENTED POLYESTER FILM AS A BASE FILM FOR A PHOTOGRAPHIC FILM

[75] Inventor: Norio Takagi, Sagamihara, Japan

[73] Assignee: Teijin Limited, Osaka, Japan

[21] Appl. No.: 708,963

[22] Filed: Sep. 6, 1996

[30] Foreign Application Priority Data

Sep. 7, 1995 [JP] Japan ................................ 7-230108

[51] Int. Cl.⁶ .............................. B29C 47/88; B29D 7/01
[52] U.S. Cl. .................. 264/169; 264/210.7; 264/216; 264/235.8; 264/290.2; 264/346
[58] Field of Search .................... 264/1.34, 169, 264/216, 1.31, 210.7, 235.8, 345, 346, 290.2

[56] References Cited

U.S. PATENT DOCUMENTS

| | | | |
|---|---|---|---|
| 4,876,137 | 10/1989 | Utsumi | 264/290.2 |
| 5,043,197 | 8/1991 | Renalls | 264/216 |
| 5,294,695 | 3/1994 | Lee et al. | |
| 5,599,658 | 2/1997 | Greener et al. | |

FOREIGN PATENT DOCUMENTS

| | | |
|---|---|---|
| 0606663A1 | 7/1994 | European Pat. Off. |
| 61-98517 | 5/1986 | Japan |
| 61-132617 | 6/1986 | Japan |
| 63-49417 | 3/1988 | Japan |
| 2-11636 | 1/1990 | Japan |
| 3-281541 | 12/1991 | Japan |

*Primary Examiner*—Mathieu D. Vargot
*Attorney, Agent, or Firm*—Sherman and Shalloway

[57] ABSTRACT

A process for producing a biaxially oriented polyester film including the steps of causing a molten aromatic polyester which contains naphthalene-2,6-dicarboxylatic acid as a main dicarboxylic acid component and ethylene glycol as a main glycol component to pass through a single-layer or multi-layer metal fiber nonwoven fabric, melt extruding the molten polymer into a form of a sheet, quenching and solidifying the sheet to produce an unoriented film, biaxially orienting the unoriented film, and thermally setting the biaxially oriented film to form a biaxially oriented polyester film, as a base film for a photographic film, which contains substantially no gel as large as 40 μm or more.

20 Claims, 1 Drawing Sheet

PROCESS FOR PRODUCING BIAXIALLY ORIENTED POLYESTER FILM AS A BASE FILM FOR A PHOTOGRAPHIC FILM

FIELD OF THE INVENTION

This invention relates to a process for producing a biaxially oriented polyester film for use as a base film for a photographic film. More specifically, it relates to a process for producing industrially advantageously a biaxially oriented polyester film which contains no gel having such a large size that gives problems in use as a base film for a photographic film.

BACKGROUND OF THE INVENTION

Heretofore, a triacetate film has been widely used as a base film for use in a photosensitive material such as an X-ray film, a photoengraving film, a roll film for photography or the like.

This triacetate film has the possibility that it may cause environmental pollution because of use of an organic solvent in its production process. Accordingly, studies are being made on a polyethylene-2,6-naphthalene dicarboxylate (PEN) film which can be formed into a film by a melt extrusion method without using such an organic solvent.

However, since PEN has a melt viscosity 6 to 8 times higher than that of polyethylene terephthalate (PET) which has been so far used as a photosensitive material, there is liable to occur its drift or stagnation in an extrusion, melt piping system. In addition, since it has a high melting point and generates a large amount of heat at the time of kneading and extrusion, the polymer temperature in the melt piping system inevitably becomes high. Therefore, the polymer has such problems that the thermal stability of the polymer is not always higher than that of PET and that a gel tends to be formed due to its thermal deterioration.

A gel formed in a photosensitive base film develops serious defect in product quality. To eliminate the defect caused by the gel of the polymer in a product film, the following measures have been taken.
(1) An appropriate thermal stabilizer is added to prevent a gel formation in the production process or melt extrusion process of the polymer.
(2) The polymer is maintained at a low temperature in the melt extrusion process.
(3) Long-time stagnation of the polymer is eliminated in the melt extrusion process.

However, measure (1) is not sufficiently effective, measure (2) is effective to some extent, but has such a problem that productivity cannot be increased because of a large pressure loss of a filter in the melt extrusion step, and measure (3) cannot be taken due to facility design in some cases.

DESCRIPTION OF RELATED ART

There have been conventionally known various filter mediums for a molten polymer.

JP-A 61-98517 (the term "JP-A" as used herein means an "unexamined published Japanese patent application") teaches a filter medium for a molten polymer which is a laminate consisting of a first layer of sintered fibers having a small average pore(or opening) size and a second layer of a sintered metal having a larger average pore(or opening) size than that of the first layer. The molten polymer is filtered by passing through the first layer and then the second layer of this filter medium.

JP-A 61-132617 discloses a melt spinning method comprising filtering an aromatic polyester which exhibits anisotropy when it is molten, through a filter medium made from inorganic fibers having a fiber diameter of 20 $\mu$m or less and having a permeability of 5% or less for particles having a diameter of 20 $\mu$m or more and melt spinning the aromatic polyester.

JP-A 63-49417 discloses a process for producing a polyethylene naphthalate film which comprises the steps of melting polyalkylene naphthalate containing not more than 10 particles having the maximum length of 4 $\mu$m or more based on 5 mg of the polymer, filtering this molten product through a nonwoven-type filter made from stainless steel thin wires having a diameter of 10 $\mu$m or less and an average pore size of 20 $\mu$m or less, extruding the the resulting filtered product from a die to produce an unoriented film, and biaxially orienting the unoriented film to form a polyethylene naphthalate film.

It is also known that the nonwoven fabric-like aggregate of metal fibers is used as dispersion means for dispersing particles into a polymer.

JP-A 2-11636 discloses a method for dispersing particles into a polymer uniformly by mixing 0.005 to 4% by weight of organic or inorganic particles having an average diameter of 0.01 to 5 $\mu$m and a repose angle of 45° or less with a molten polymer and causing the resulting mixture to pass through a nonwoven fabric-like aggregate which satisfies the following expression:

$$\ln \left( \sum_i \frac{(1-\epsilon i) \times Li}{di^2} \times 10^{-3} \right) \geq 0$$

wherein $\epsilon i$ is a porosity of an i-th layer of the nonwoven fabric-like aggregate, Li is a thickness (mm) of the i-th layer of the nonwoven fabric-like aggregate and di is an average fiber diameter (mm) of the i-th layer of the nonwoven fabric-like aggregate.

Further, JP-A 3-281541 teaches that the lower limit value of the above expression should be −1 when the particles to be mixed with the molten polymer are inorganic or organic particles having an average diameter of 0.01 to 5 $\mu$m and a contact angle with water of 10° or more.

Important optical properties required for a base film for a photosensitive material are as follows. (1) There should be no partial change in the amount of the transmitted light and (2) distortion does not occur in the transmitted light. However, the partial change in the amount of transmitted light of (1) is often caused by inorganic coarse particles which usually have a certain degree of hardness and are hardly deformed. Therefore, this problem can be eliminated by using a filter having a filtering accuracy suitable for removing the coarse particles. That is, reference to such a filter medium is found in JP-A 61-98517, JP-A 61-132617 and JP-A 63-49417.

The distortion of (2) is caused by the gel of a polymer in most cases. The gel is produced by the deterioration of the polymer and is easily deformed by stress though there is a little difference depending on the degree of deterioration. In the production process of a film, there may be produced a gel having such a large size that can be hardly estimated from the average pore size of the filter. It is presumed that the gel passes through the pore of the filter, while deforming repeatedly. Therefore, it is assumed that it will be difficult to remove the gel with the above dispersion means described in JP-A 2-11636 and JP-A 3-281541.

A PEN film for a photosensitive material is obtained by biaxially-orienting a sheet extruded from a die to 3 to 4 times in biaxial directions. At this point, a gel contained in the sheet is oriented almost in proportion to the draw ratios and hence, becomes large. Therefore, though not so large when it passes through an orifice, the gel becomes a large defect in the biaxially oriented film.

The allowable size of a foreign matter contained in a PEN film for a photosensitive material needs to be less than 40 μm, preferably 30 μm or less, more preferably 20 μm or less to achieve (2) above.

OBJECTS OF THE INVENTION

It is an object of the present invention to provide a process for producing industrially advantageously a biaxially oriented film for use as a base film for a photographic film, which contains substantially no gel as large as 40 μm or more.

It is another object of the present invention to provide a process for producing the above biaxially oriented polyester film by causing a molten aromatic polyester which contains naphthalene-2,6-dicarboxylatic acid as a main dicarboxylic acid component and has a high melt viscosity to pass through a metal fiber nonwoven fabric which satisfies specified conditions.

The above and other objects and advantages of the present invention will become apparent from the following description.

SUMMARY OF THE INVENTION

According to the present invention, the above objects and advantages of the present invention can be attained by a process for producing a biaxially oriented polyester film comprising the steps of:

causing a molten aromatic polyester containing naphthalene-2,6-dicarboxylic acid as a main dicarboxylic acid component and ethylene glycol as a main glycol component to pass through a single-layer or multi-layer metal fiber nonwoven fabric which satisfies the following expression (1)

$$1.8 < \ln\left(\sum_{i}^{n} 10 \times (100 - \epsilon i) \times Li/di^2\right) < 6 \quad (1)$$

wherein ϵi is a porosity (%) of an i-th layer of a metal fiber nonwoven fabric, Li is a thickness (mm) of the i-th layer of the metal fiber nonwoven fabric and di is an average fiber diameter (μm) of the i-th layer of the metal fiber nonwoven fabric; melt extruding the molten aromatic polyester into a form of a sheet; quenching and solidifying the sheet to form an unoriented film; biaxially orienting the unoriented film; and thermally setting the biaxialy oriented film to form a biaxially oriented polyester film, as a base film for a photographic film, which contains substantially no gel as large as 40 μm or more.

DESCRIPTION OF THE PREFERRED EMBODIMENTS OF THE INVENTION

Figure 1:
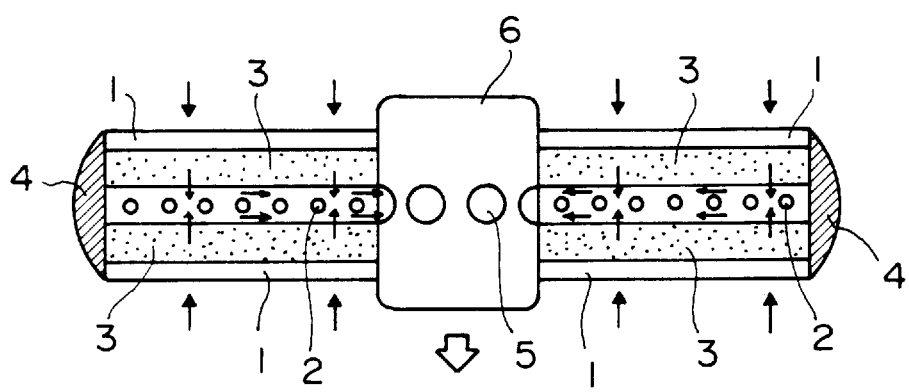
FIG. 1 of the attached drawing is a schematic view of the leaf disk used in the present invention.

The aromatic polyester of the present invention contains naphthalene-2,6-dicarboxylatic acid as a main dicarboxylic acid component and ethylene glycol as a main glycol component.

In other words, the aromatic polyester contains naphthalene-2,6-dicarboxylatic acid in an amount of at least 50 mole % of the total of all the dicarboxylic acid components and ethylene glycol in an amount of at least 50 mole % of the total of all the glycol components.

A particularly preferred aromatic polyester contains naphthalene-2,6-dicarboxylatic acid in an amount of at least 90 mole %, preferably at least 98 mole % of the total of all the dicarboxylic acid components and ethylene glycol in an amount of at least 90 mole %, preferably at least 98 mole % of the total of all the glycol components.

Illustrative examples of the dicarboxyli acid component other than naphthalene-2,6-dicarboxylatic acid include aromatic dicarboxylic acids such as terephthalic acid, isophthalic acid and naphthalene-2,7-dicarboxylatic acid; and aliphatic dicarboxylic acids such as adipic acid and sebacic acid.

Illustrative examples of the glycol component other than ethylene glycol include aliphatic glycols such as tetramethylene glycol, 1,4-cyclohexane dimethanol and polyoxyalkylene glycol.

Oxy-carboxylic acid such as oxy-benzoic acid may be a constituent component of the aromatic polyester.

The aromatic polyester may be blended with or contain an additive such as a stabilizer, colorant or the like; and a lubricant such as inorganic fine particles exemplified by silica or organic fine particles exemplified by a crosslinked silicone resin in such an amount that does not cause optical trouble in a base film for a photographic film. In this case, the lubricant having an average particle diameter of 0.6 μm or less is used. When a lubricant is used, there is the possibility that optical trouble may occur if a nucleating agent forms a coherent nucleus. It is, therefore, important to suppress the formation of a coherent nucleus as much as possible. To this end, at the initial stage of the polymerization of a polymer, a lubricant is dispersed uniformly in a glycol solution and then, the solution is added for polymerization. Colorants conventionally known or used as a colorant for a polyester base film for a photographic film may be used.

According to the process of the present invention, the above molten aromatic polyester is caused to pass through a nonwoven fabric of metal fibers. This nonwoven fabric is a porous aggregate having continuous vent pores obtained by aggregating metal fibers, i.e., a fibrous metal, irregularly in the form of a nonwoven fabric and fuse-bonding the contact points of fibers together.

The metal fiber is preferably formed of a material having corrosion resistance and oxidation resistance, such as stainless steel or Hastelloy.

The metal fiber preferably has an average diameter of 1.5 to 20 μm, more preferably 1.5 to 10 μm.

The nonwoven fabric can be formed from metal fibers having the same fiber diameter only, or a combination or a mixture of metal fibers having different fiber diameters.

The nonwoven fabric may consist of a single layer or two or more layers. The plurality of layers may have different properties such as porosity, thickness and average fiber diameter of metal fibers.

The nonwoven fabric is advantageously manufactured by heating an irregular aggregate of metal fibers and fuse-bonding the contact points of fibers together.

According to the process of the present invention, the single layer or multiple layers of the above metal fiber nonwoven fabric must satisfy the above-mentioned expression (1). That is, predetermined relationship must be established among porosity, thickness, average fiber diameter and the number of layers which are the properties of the metal fiber nonwoven fabric.

In the above expression (1), when $$\ln \left( \sum_{i}^{n} 10 \times (100 - ei) \times Li/di^2 \right)$$

is represented by symbol F, this expression (1) can be represented as follows.

$$1.8 < F < 6.0 \qquad (1).$$

It can be said that the physical amount of the symbol F is a natural logarithmic value of the total length of metal fibers contained in the unit area of the nonwoven fabric and shows a natural logarithmic value of the degree of contact between the molten substance and metal fibers.

By causing the polymer to pass through the nonwoven fabric which satisfies the above expression (1), a gel produced in the step of polymerizing a polymer or the step of melting the polymer with an extruder and transferring the molten polymer can be cut into pieces in a highly fine degree and dispersed. That is, when F is less than 1.8, the effect of cutting and dispersing the gel is insufficient and when F is more than 6, a pressure loss in the step of melt-transferring the polymer is large, thereby making it impossible to process a large amount of the polymer and increase productivity.

The nonwoven fabric used in the present invention preferably satisfies the following expression (1)-1:

$$2.2 < F < 5 \qquad (1)-1$$

wherein F is defined the same as above, more preferably satisfies the following expression (1)-2:

$$2.5 < F < 5 \qquad (1)-2$$

wherein F is defined the same as above.

In the above expression (1) (including the expressions (1)-1 and (1)-2), the porosity $ei$ of the i-th layer of the metal fiber nonwoven fabric is preferably 50 to 78%, more preferably 53 to 77%, the most preferably 55 to 75%.

In the above expression (1), the average fiber diameter of the i-th layer of the metal fiber nonwoven fabric is preferably 1.5 to 20 µm, more preferably 1.5 to 10 µm, the most preferably 2 to 6 µm.

In the above expression (1), the thickness of the i-th layer of the metal fiber nonwoven fabric is preferably 0.1 to 2 mm, more preferably 0.2 to 2 mm.

In the process of the present invention, the total thickness of the single-layer or multi-layer metal fiber nonwoven fabric is preferably 0.2 to 3 mm, more preferably 0.3 to 2.5 mm.

In the process of the present invention, particularly when a large amount of the polymer or a polymer having high viscosity passes through the nonwoven fabric, a large pressure difference is produced. Therefore, it is necessary to increase the pressure resistance of the nonwoven fabric. For example, a metal fiber nonwoven fabric fabricated into a form of a leaf disk is preferred. FIG. 1 is a schematic sectional view of this leaf disk with sealed portions 4. In FIG. 1, the arrows show the flow directions of a molten polymer. The molten polymer reaches the leaf disk from both front and rear sides, passes through a reinforced mesh 1 and reaches a metal fiber nonwoven fabric 3. When the molten polymer passes through the nonwoven fabric, a gel contained in the molten polymer is cut into pieces and reaches a wire mesh 2. Then it passes through the wire mesh 2, moves toward a center aggregate portion 6 and is collected to the center aggregate portion 6 through openings 5. A wide passing area can be secured for the molten polymer by piling up a plurality of the leaf disks of FIG. 1 in such a manner that the overlapped center aggregate portions 6 form a single hollow axis for passing the molten polymer.

According to the process of the present invention, it is advantageous that the molten aromatic polyester is caused to pass through the metal fiber nonwoven fabric preferably at a rate of 20 to 200 kg/hr, more preferably 40 to 170 kg/hr, based on the unit passing area (m$^2$) of the nonwoven fabric.

According to the process of the present invention, the molten aromatic polyester passing through the metal fiber nonwoven fabric is melt extruded into a form of a sheet, and quenched and solidified to form an unoriented film.

Quenching and solidification are carried out by an electrostatic pinning method (giving a static charge on one side of a sheet and pinning the sheet to a rotary cooling drum by this electrostatic force) or a vacuum pinning method (pinning a sheet to a rotary cooling drum by reducing the pressure of the space between the sheet and the rotary drum).

Thereafter, the unoriented film is biaxially oriented and then thermally set. Biaxial orientation is carried out by a simultaneous biaxial orientation method or sequential biaxial orientation method. The sequential biaxial orientation method is particularly preferred. The draw temperature is Tg to Tg+70° C. (Tg is a secondary transition point of the aromatic polyester) and the draw ratio is preferably 2 to 5 times in both longitudinal and transverse directions. The thermal setting is preferably carried out at a temperature between a temperature 50° C. higher than the secondary transition point (Tg) and a temperature 140° C. higher than the secondary transition point. The thermal setting time is preferably 1 to 60 seconds.

According to the process of the present invention, a biaxially oriented polyester film which contains substantially no gel as large as 40 µm or more, for example, no more than 0.1 gel as large as 40 µm or more, in a film area of 100 m$^2$ can be obtained.

The biaxially oriented polyester film obtained by the process of the present invention preferably contains no more than 1 gel as large as 30 to 39 µm, more preferably no more than 0.1 gel as large as 30 to 39 µm based on the above standard.

The physical values and properties in the present invention were measured in accordance with the following methods.

1) Effect of cutting and dispersing gel

The polymer is supplied to an extruder, molten, transferred at 300° C., caused to pass through a metal fiber nonwoven fabric fabricated in a form of a leaf disk, and extruded from a die into a form of a 583 µm thick sheet. The sheet is then quenched and drawn to 3.5 times in a longitudinal direction and to 3.7 times in a transverse direction to produce a biaxially oriented film. The film is observed through a polarization microscope, and fish eyes which are presumed to be caused by a gel are divided into three groups according to size: one group having a diameter of 20 to 29 µm, another group having a diameter of 30 to 39 µm and the other group having a diameter of 40 µm or more. The number of fish eyes of each group in an area of 100 cm$^2$ is counted.

2) Thickness, porosity and average fiber diameter of i-th layer of nonwoven fabric-like sintered body A small piece of a nonwoven fabric is immersed in an epoxy resin to fill its internal pores with the resin completely and is solidified. The piece is cut at the center and polished to prepare a flat section. The surface of this polished flat section is observed by a metal microscope. In the case of a multi-layer structure formed by a plurality of layers having different fiber diameters and/or porosities, a single layer is trimmed to prepare an i-th layer.

(1) The thickness of the i-th layer is obtained from a trimmed observed image.

(2) The porosity of the i-th layer is obtained from the ratio of the total area of the resin portion to the total area of the i-th layer of the trimmed observed image.

(3) The fiber diameter of the i-th layer is obtained as follows. Circular area equivalent diameters of each fiber are obtained for at least 50 images suitable to measure an accurate fiber diameter, excluding those not suitable to measure accurate fiber diameter such as portions where a plurality of fibers are bonded together or fiber inclined cut surfaces among trimmed observed images, and an average of these values is taken as an average fiber diameter.

The present invention is described in more details with reference to the following examples.

Examples 1 to 3 and Comparative Examples 1 and 2

Polyethylene-2,6-naphthalene dicarboxylate containing 80 ppm of a blue dye was supplied to an extruder and molten. The molten polymer was transferred at 300° C. and caused to pass through a stainless steel fiber nonwoven fabric which had properties shown in Table 1 and was fabricated into a form of a leaf disk, was extruded from a die into a form of a sheet on a rotary cooling drum and quenched by an electrostatic pinning method to produce an unoriented film. The unoriented film was drawn to 3.5 times in a longitudinal direction and then to 3.7 times in a transverse direction to produce a biaxially oriented film. This film was evaluated by a method for measuring the above gel cutting and dispersion effect.

The constitution of the nonwoven fabric-like sintered body used herein and the gel cutting and dispersion effect of the film obtained by passing through this nonwoven fabric-like sintered body are shown in Table 1. The results show that the effect in Examples is greatly improved over that in Comparative Examples.

TABLE 1

| | Constitution of nonwoven fabric | | | | Dispersion effect (number) | | | Evaluation of |
|---|---|---|---|---|---|---|---|---|
| | d $\mu$m | $\epsilon$ % | L mm | F* | 20–29 $\mu$m | 30–39 $\mu$m | 40– $\mu$m | dispersibility** |
| Ex.1 | 6 | 60 | 1.0 | 2.41 | 6 | 1 | 0 | ◯ |
| Ex.2 | 4 | 64 | 0.8 | 2.89 | 3 | 0 | 0 | ◯ |
| Ex.3 | 2 | 67 | 0.6 | 3.90 | 1 | 0 | 0 | ◯ |
| Com. Ex. 1 | 8 | 67 | 0.9 | 1.53 | 22 | 7 | 3 | X |
| Com. Ex. 2 | 6 | 74 | 0.7 | 1.63 | 15 | 4 | 1 | X |

$*F = \ln\left(\dfrac{10 \times (100 - \epsilon) \times L}{d^2}\right)$

**◯: good, X: not good

Example 4

A biaxially oriented film was obtained in the same manner as in Example 1 except that polyethylene-2,6-naphthalene dicarboxylate containing 0.005% by weight of spherical silica particles having an average particle diameter of 0.2 $\mu$m was supplied to an extruder and molten and that the molten polymer was caused to pass through a three-layered stainless steel nonwoven fabric-like sintered body having constitution shown in Table 2 and extruded into a form of a sheet from a die. The thus obtained biaxially oriented film was evaluated by the method for measuring the gel cutting and dispersing effect. The result is shown in Table 3. A film excellent in gel dispersibility was obtained.

TABLE 2

| | Constitution of non-woven fabric | | | | Dispersion effect (number) | | | Evaluation of |
|---|---|---|---|---|---|---|---|---|
| i | di $\mu$m | $\epsilon_i$ % | Li mm | F* | 20–29 $\mu$m | 30–39 $\mu$m | 40– $\mu$m | dispersibility** |
| 1 | 6 | 67 | 0.3 | 3.56 | 2 | 0 | 0 | ◯ |
| 2 | 4 | 67 | 0.3 | in | | | | |
| 3 | 2.5 | 67 | 0.3 | total | | | | |

*, ** are the same as in Table 1.

What is claimed is:

1. A process for producing a biaxially oriented polyester film comprising the steps of:

causing a molten aromatic polyester which contains naphthalene-2, 6-dicarboxylatic acid as a main dicarboxylic acid component and ethylene glycol as a main glycol component and polymer gel particles larger than 40 $\mu$m in diameter to pass through a single-layer or multi-layer metal fiber nonwoven fabric which satisfies the following expression (1):

$$1.8 < \ln\left(\sum_{i}^{n} 10 \times (100 - \epsilon_i) \times Li/di^2\right) < 6 \qquad (1)$$

wherein $\epsilon_i$ is a porosity (%) of an i-th layer of the metal fiber nonwoven fabric, Li is a thickness (mm) of the i-th layer of the metal fiber nonwoven fabric, di is an average fiber diameter ($\mu$m) of the i-th layer of the metal fiber nonwoven fabric, and n is a number of layers, whereby the polymer gel particles are cut and dispersed;

melt extruding the molten polymer into a form of a sheet;

quenching a solidifying the sheet to produce an unoriented film;

biaxially orienting the unoriented film; and thermally setting the biaxially oriented film to form a biaxially oriented polyester film, as a base film for a photographic film, which contains substantially no gel polymer particles as large as 40 $\mu$m or more in diameter.

2. The process of claim 1, wherein the aromatic polyester contains naphthalene-2,6-dicarboxylatic acid in an amount of at least 90 mole % of the total of all the dicarboxylic acid components and ethylene glycol in an amount of at least 90 mole % of the total of all the glycol components.

3. The process of claim 1, wherein the single-layer or multi-layer metal fiber nonwoven fabric satisfies the following expression (1)-1:

$$2.2 < \ln\left(\sum_{i}^{n} 10 \times (100 - \epsilon_i) \times Li/di^2\right) < 5 \qquad (1)\text{-}1$$

wherein $\epsilon_i$, Li, di and n are defined the same as above.

4. The process of claim 1, wherein the single-layer or multi-layer metal fiber nonwoven fabric satisfies the following expression (1)-2:

$$2.5 < \ln\left(\sum_{i}^{n} 10 \times (100 - \epsilon_i) \times Li/di^2\right) < 5 \qquad (1)\text{-}2$$

wherein $\epsilon_i$, Li, di and n are defined the same as above.

5. The process of claim 1, wherein the porosity $\epsilon_i$ of the i-th layer of the metal fiber nonwoven fabric in the expression (1) is in the range of 50 to 78%.

6. The process of claim 1, wherein the thickness of the i-th layer of the metal fiber nonwoven fabric in the expression (1) is in the range of 0.1 to 2 mm.

7. The process of claim 1, wherein the total thickness of the single-layer or multi-layer metal fiber nonwoven fabric is in the range of 0.2 to 3 mm.

8. The process of claim 1, wherein the average fiber diameter of the i-th layer of the metal fiber nonwoven fabric in the expression (1) is in the range of 1.5 to 20 $\mu$m.

9. The process of claim 1, wherein the molten aromatic polyester is caused to pass at a rate of 20 to 200 kg/hr per the unit passing effective area (m$^2$) of the metal fiber nonwoven fabric.

10. The process of claim 1, wherein the unoriented film is drawn to 2 to 5 times in each of longitudinal and transverse directions.

11. The process of claim 1, wherein thermal setting is carried out at a temperature between a temperature 50° C. higher than the secondary transition point (Tg) of the aromatic polyester and a temperature 140° C. higher than the secondary transition point of the aromatic polyester.

12. The process of claim 1 for forming a biaxially oriented polyester film in which no more than 0.1 gel as large as 40 $\mu$m or more is present in a film area of 100 cm$^2$.

13. A process for producing a biaxially oriented polyester film suitable for use as a base film for a photographic film which comprises the steps of:

causing a molten aromatic polyester which contains naphthalene-2,6-dicarboxylic acid as a main dicarboxylic acid component and ethylene glycol as a main glycol component and polymer gel particles larger than 40 $\mu$m in diameter to pass through a single-layer or multi-layer metal fiber non-woven fabric comprising a porous aggregate of metal fibers having an average diameter of 1.5 to 20 $\mu$m which are fuse-bonded at their points of contact, said non-woven fabric having a thickness of 0.1 to 2 mm and a porosity of 50–78%, whereby the polymer gel particles are cut and dispersed;

melt extruding the molten polymer into a form of a sheet;

quenching and solidifying the sheet to produce an unoriented film;

biaxially orienting the unoriented film; and thermally setting the biaxially oriented film to form a biaxially oriented film, which contains substantially no polymer gel particles 40 $\mu$m or more in diameter.

14. The process of claim 13, wherein the aromatic polyester contains naphthalene-2,6-dicarboxylatic acid in an amount of at least 90 mole % of the total of all the dicarboxylic acid components and ethylene glycol in an amount of at least 90 mole % of the total of all the glycol components.

15. The process of claim 13, wherein the total thickness of the single-layer or multi-layer metal fiber nonwoven fabric is in the range of 0.2 to 3 mm.

16. The process of claim 13, wherein the average fiber diameter of the metal fiber nonwoven fabric is in the range of 1.5 to 10 $\mu$m.

17. The process of claim 13, wherein the molten aromatic polyester is caused to pass at a rate of 20 to 200 kg/hr per the unit passing effective area (m$^2$) of the metal fiber nonwoven fabric.

18. The process of claim 13, wherein the unoriented film is drawn to 2 to 5 times in each of longitudinal and transverse directions.

19. The process of claim 13, wherein thermal setting is carried out at a temperature between a temperature 50° C. higher than the secondary transition point (Tg) of the aromatic polyester and a temperature 140° C. higher than the secondary transition point of the aromatic polyester.

20. The process of claim 13 for forming a biaxially oriented polyester film in which no more than 0.1 of polymer gel particles are 40 $\mu$m or more in diameter in a film area of 100 cm$_2$.

* * * * *